(12) United States Patent
DiMassimo et al.

(10) Patent No.: US 9,758,416 B2
(45) Date of Patent: *Sep. 12, 2017

(54) SYSTEM AND METHOD FOR TREATING WASTEWATER AND RESULTING SLUDGE

(71) Applicant: Veolia Water Solutions & Technologies Support, Saint-Maurice (FR)

(72) Inventors: Richard W. DiMassimo, Raleigh, NC (US); Soren J. Hojsgaard, Hillerod (DK)

(73) Assignee: Veolia Water Solutios & Technologies Support, Saint-Maurice (FR)

( * ) Notice: Subject to any disclaimer, the term of this patent is extended or adjusted under 35 U.S.C. 154(b) by 281 days.

This patent is subject to a terminal disclaimer.

(21) Appl. No.: 13/862,805

(22) Filed: Apr. 15, 2013

(65) Prior Publication Data

US 2014/0305865 A1   Oct. 16, 2014

(51) Int. Cl.
| | | |
|---|---|---|
| C02F 3/28 | (2006.01) | |
| C02F 11/12 | (2006.01) | |
| C02F 11/04 | (2006.01) | |
| C02F 11/18 | (2006.01) | |

(52) U.S. Cl.
CPC .............. *C02F 11/04* (2013.01); *C02F 11/18* (2013.01); *C02F 11/185* (2013.01); *C02F 11/12* (2013.01); *C02F 2303/06* (2013.01); *C02F 2303/24* (2013.01)

(58) Field of Classification Search
CPC  C02F 3/12; C02F 11/185; C02F 11/18; C02F 3/28; C02F 9/00

USPC .......... 210/609, 149, 151; 165/299
See application file for complete search history.

(56) References Cited

U.S. PATENT DOCUMENTS

| | | | |
|---|---|---|---|
| 6,325,935 | B1 | 12/2001 | Hojsgaard |
| 8,641,902 | B2 | 2/2014 | Ewert et al. |
| 2003/0121851 | A1* | 7/2003 | Lee, Jr. ................. 210/603 |
| 2010/0240094 | A1* | 9/2010 | Gantefort et al. ......... 435/41 |
| 2011/0214930 | A1* | 9/2011 | Betts et al. ............. 180/65.1 |
| 2011/0318778 | A1* | 12/2011 | Petersen et al. ........... 435/41 |

(Continued)

FOREIGN PATENT DOCUMENTS

| | | |
|---|---|---|
| DE | 3709316 A1 | 10/1987 |
| EP | 2520379 A2 | 11/2012 |
| WO | 2009031796 A2 | 3/2009 |

(Continued)

OTHER PUBLICATIONS

Carrere, H., et al., "Pretreatment methods to improve sludge anaerobic degradability: A review", Journal of Hazardous Materials, Elsevier, 2010, pp. 1-15, vol. 183, No. 1-3, Amsterdam, NL, XP027586038.

(Continued)

*Primary Examiner* — Claire Norris
(74) *Attorney, Agent, or Firm* — Coats & Bennett PLLC

(57) ABSTRACT

A wastewater treatment process that produces primary sludge and biological sludge. The system and process hydrolyzes the biological sludge in a hydrolysis reactor. The primary sludge is directed to a pasteurization unit and pasteurized. Thereafter, the hydrolyzed biological sludge and the pasteurized primary sludge are directed to an anaerobic digester where the combined sludges are subjected to anaerobic digestion.

19 Claims, 2 Drawing Sheets

(56) References Cited

U.S. PATENT DOCUMENTS

2012/0117967 A1* 5/2012 Loveday et al. ............. 60/641.2

FOREIGN PATENT DOCUMENTS

| WO | 2009112208 | A2 | | 9/2009 | |
|----|------------|----|---|--------|---|
| WO | WO2012019310 | | * | 2/2012 | ............... C02F 9/14 |
| WO | 2013034765 | A1 | | 3/2013 | |
| WO | 2013151836 | A1 | | 10/2013 | |

OTHER PUBLICATIONS

International Search Report mailed Aug. 5, 2014 in re International Application No. PCT/US2014/033988 filed Apr. 14, 2014.

* cited by examiner

SYSTEM AND METHOD FOR TREATING WASTEWATER AND RESULTING SLUDGE

FIELD OF THE INVENTION

The present invention relates to wastewater treatment and more particularly to systems and methods for treating wastewater and resulting sludge.

SUMMARY OF THE INVENTION

The present invention relates to a wastewater treatment process that produces primary sludge and biological sludge. The biological sludge is thermally hydrolyzed in a hydrolysis reactor. The primary sludge is directed to a pasteurization unit and pasteurized. Thereafter, the hydrolyzed biological sludge and the pasteurized primary sludge are directed to an anaerobic digester and, in one embodiment, the hydrolyzed biological sludge and the pasteurized primary sludge are combined before being directed into the anaerobic digester.

In one embodiment, heat is transferred from the hydrolyzed sludge and the pasteurized primary sludge to the primary sludge before entering the pasteurization unit. Sufficient heat is recovered from the hydrolyzed biological sludge and the pasteurized primary sludge to raise the temperature of the primary sludge to a pasteurization temperature, generally about 70° C. and above.

Another aspect of the present invention is to provide a system and process for pretreating sludge prior to anaerobic digestion that substantially reduces the energy required for pretreatment. This system and process recognizes that portions of the total sludge produced in the course of wastewater treatment may not require hydrolysis. Thus, the system and process herein selectively hydrolyzes only a portion of the total sludge produced by a wastewater treatment process.

Other objects and advantages of the present invention will become apparent and obvious from a study of the following description and the accompanying drawings which are merely illustrative of such invention.

DESCRIPTION OF EXEMPLARY EMBODIMENTS

Figure 1:
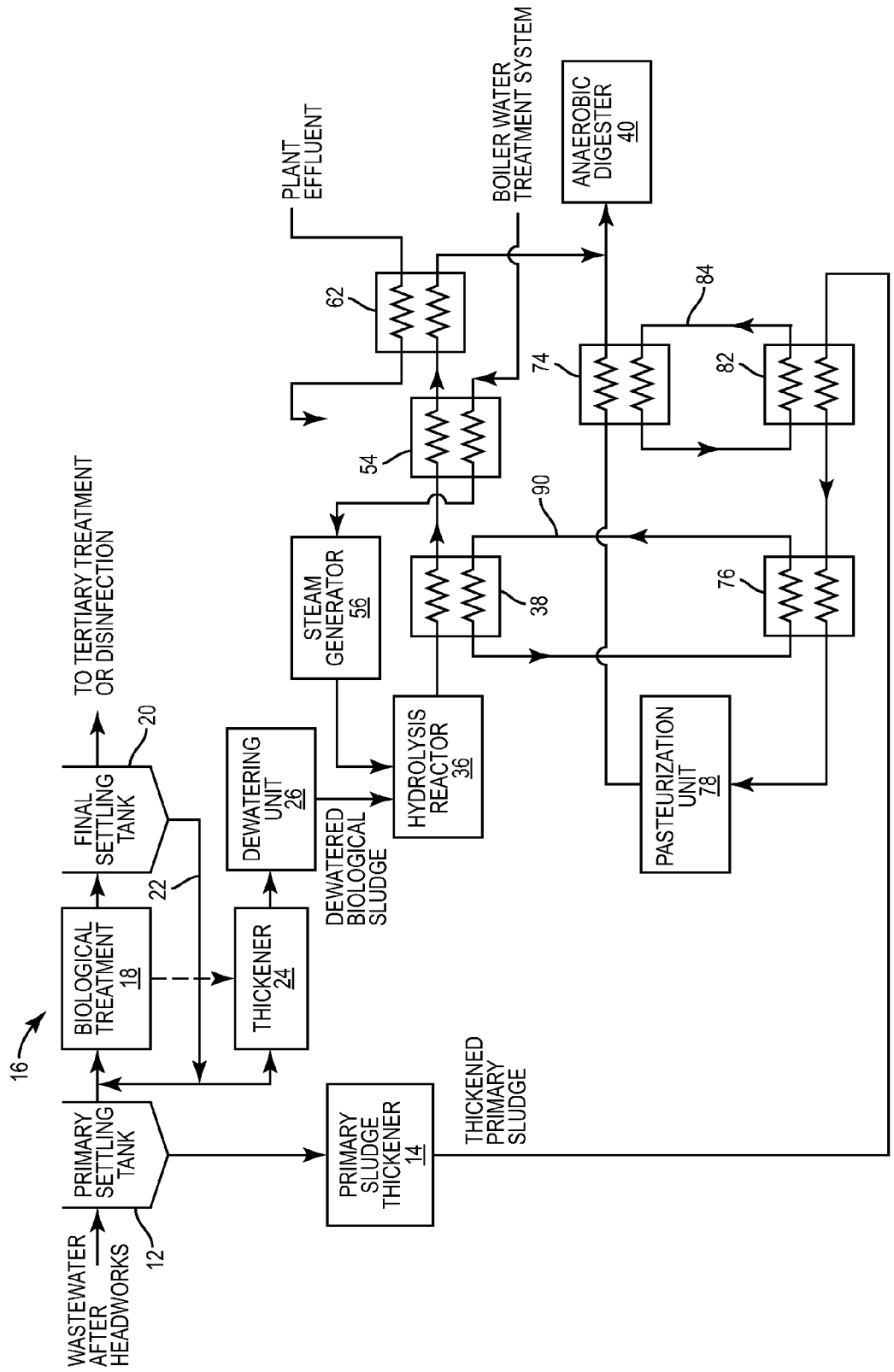
FIG. 1 is a schematic illustration of a wastewater treatment process.

With further reference to the drawings, particularly FIG. 1, there is shown therein a wastewater treatment system indicated generally by the numeral 10. Wastewater treatment system 10 comprises primary treatment followed by biological treatment of the wastewater. In particular, wastewater influent is directed into a primary treatment unit or system that includes a primary settling tank 12. During the course of subjecting the wastewater to primary treatment, primary sludge is settled in the primary settling tank 12. This primary sludge is directed to a primary sludge thickener 14 that thickens the primary sludge.

Downstream of the primary treatment unit or system is a biological treatment unit or system indicated generally by the numeral 16. Biological treatment system 16 includes one or more reactors 18 for biologically treating the wastewater. Downstream of the reactor or reactors 18 is a clarifier 20. Clarifier 20 produces an effluent that may be directed to tertiary treatment or disinfection. Clarifier 20 also produces a sludge, activated sludge, a portion of which is returned to the reactor or reactors 18 through a return activated sludge line 22. A portion of the sludge produced by the clarifier 20 is wasted. This is sometimes referred to as waste activated sludge and herein is referred to as biological sludge. It is directed to a biological sludge thickener 24 which functions to thicken the biological sludge produced by the clarifier 20. From the thickener 24, the biological sludge is directed to a dewatering unit 26 where the biological sludge is subjected to a dewatering process. Typically the biological sludge produced by the dewatering unit 26 will have a dry solids content of approximately 18%. As used herein, dry solids content, when referred to on a percentage basis, is based on weight.

Details of the primary treatment unit and the biological treatment system 16 are not dealt with here in detail because these processes are well known and appreciated by those skilled in the art. Generally, primary treatment follows preliminary treatment where gross solids such as large objects, rags and grit are removed from the wastewater stream. Primary treatment is generally a physical operation and is usually carried out as a sedimentation process. Primary treatment is generally used to remove the settleable materials found in the wastewater. In some cases, advanced primary treatment may entail chemical additions to enhance the removal of suspended solids. Biological treatment that follows the primary treatment is often referred to as secondary treatment. There are various types and forms of biological treatment. For example, biological treatments can be designed to remove BOD, to nitrify and denitrify, to remove phosphorus and even heavy metals. Biological treatment can rely on suspended biomass or biofilms or, in some cases, a combination of both.

As discussed above, primary and biological treatment produces both primary sludge and biological sludge. In the present process, both the biological sludge and the primary sludge is pretreated and then subjected to anaerobic digestion. As detailed below, the biological sludge is subjected to a thermal hydrolysis process that produces hydrolyzed biological sludge. The hydrolyzed biological sludge is cooled. The primary sludge, on the other hand, is subjected to pasteurization in a pasteurization unit and then cooled. After the hydrolyzed biological sludge has been cooled and after the primary sludge has been subjected to pasteurization and cooled, in one embodiment, the two sludges are combined and then directed to an anaerobic digester where the combined biological sludge and primary sludge is subjected to anaerobic digestion.

Figure 2:
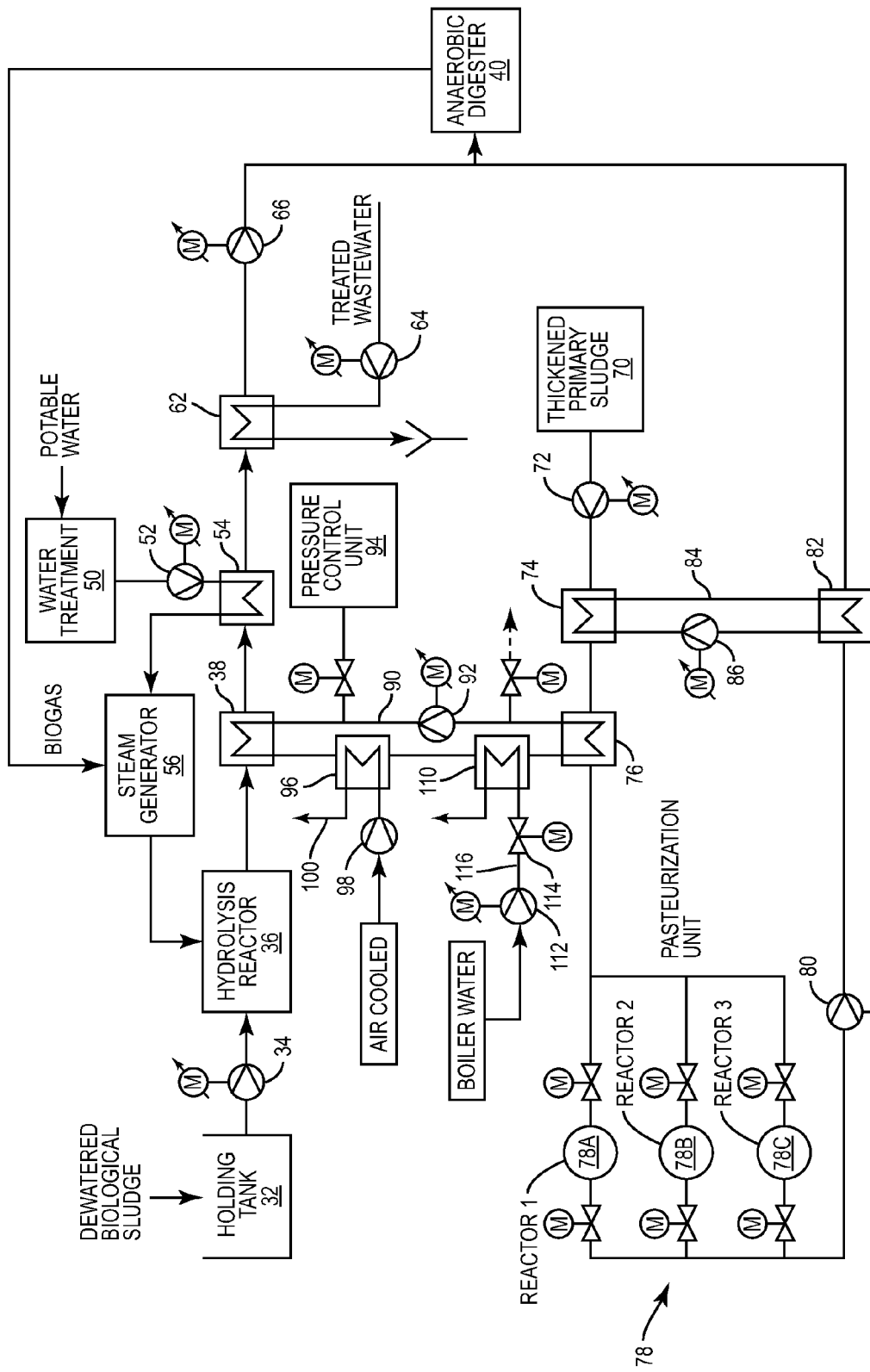
FIG. 2 is a more detailed illustration of the system and process utilized to treat sludge resulting from primary or secondary treatment of wastewater.

FIG. 2 shows one embodiment of a pretreatment system for pretreating the biological sludge and the primary sludge. This sludge treatment system is indicated generally by the numeral 30 in FIG. 2. With reference to FIG. 2, the biological sludge produced by the biological treatment system shown in FIG. 1 is directed into a holding tank 32. A pump 34 pumps the biological sludge from the holding tank 32 to a hydrolysis reactor 36. In the hydrolysis reactor 36, the biological sludge is subjected to a hydrolysis process which produces hydrolyzed sludge. The hydrolysis process includes directing steam from a steam generator 56 into the hydrolysis reactor 36 and heating the biological sludge to a temperature of approximately 140° C. to approximately 165° C. In one embodiment, the pressure in the hydrolysis reactor is maintained at about 8 bars, depending on the process temperature. This supports hydrolysis of the biological sludge and results in the reduction of dry solids concentration in the sludge. As will be discussed subsequently, the hydrolyzed sludge produced by the hydrolysis reactor 36 passes through a number of heat exchangers. Hydrolyzed sludge leaving the hydrolysis reactor 36 is directed through a first heat exchanger 38. As will be described later, the first heat exchanger 38 is effective to work in conjunction with a heat transfer network that transfers heat from the hydrolyzed biological sludge to the primary sludge before the primary sludge enters a pasteurization unit 78. Other heat exchangers are provided downstream of heat exchanger 38. The purpose of the heat exchangers is to cool the hydrolyzed sludge to a temperature that enables the hydrolyzed sludge to be efficiently digested in a downstream anaerobic digester 40. As will be discussed in more detail subsequently herein, before the cooled hydrolyzed sludge is directed into the aerobic digester 40, in one embodiment, the hydrolyzed sludge is mixed with pasteurized primary sludge.

Prior to combining the hydrolyzed sludge with the pasteurized primary sludge, the system of the present invention generates steam that is used in the hydrolysis reactor 36. As seen in FIG. 2, a water supply, such as potable water, is directed into a water treatment unit 50. Since the water is going to be ultimately directed into the steam generator 56, it is beneficial and desirable to remove hardness and other scaling or fouling species from the potable water before the water enters the steam generator 56. Thus, the water treatment unit 50 may include various types of water treatment processes for conditioning the water for use in the steam generator 56. A pump 52 pumps treated water from the water treatment unit 50 to a heat exchanger 54. The hydrolyzed sludge produced by the hydrolysis reactor 36 passes through the heat exchanger 54 after exiting the heat exchanger 38, and the water from the water treatment unit 50 cools the hydrolyzed sludge. In the process, the temperature of the treated water is raised in the heat exchanger 54. Water leaving the heat exchanger 54 is directed into the steam generator 56 which produces steam that is directed into the hydrolysis reactor 36.

Hydrolyzed sludge leaving the heat exchanger 54 is still at a relatively high temperature and to optimize the anaerobic digestion process, it is desirable to further reduce the temperature of the hydrolyzed sludge. This is accomplished in one embodiment by directing treated wastewater through another heat exchanger 62. More particularly, a pump 64 is utilized to pump treated wastewater through heat exchanger 62. The hydrolyzed sludge leaving heat exchanger 54 is directed through heat exchanger 62 and is cooled by the treated wastewater passing therethrough. Hydrolyzed sludge that leaves the heat exchanger 62 has been substantially cooled.

Primary sludge that is produced by the primary sludge thickener 14 is directed into a holding tank 70. A pump 72 pumps the primary sludge through a heat exchanger 74. From the heat exchanger 74, the primary sludge is directed to another heat exchanger 76, which is sometimes referred to herein as a second heat exchanger. From heat exchanger 76 the primary sludge is directed to a pasteurization unit indicated generally by the numeral 78. Pasteurization unit 78 functions to pasteurize the primary sludge. Pasteurization unit 78 can take the form of a batch pasteurizing unit or a plug flow unit. In the embodiment illustrated in FIG. 2, a batch pasteurization unit is shown. There is provided three batch reactors, 78A, 78B and 78C. In a typical batch pasteurization process, one reactor will assume a fill mode, while a second reactor will assume a hold mode and a third reactor will assume a drawdown mode. In any event, the primary sludge is pasteurized in the pasteurization unit 78 and then pumped by pump 80 through another heat exchanger 82. It is appreciated that the temperature of the pasteurized primary sludge is greater than the temperature of the primary sludge directed into heat exchanger 74. Thus, the pasteurized sludge heats a heat transfer medium in conduit 84. A pump 86 pumps the heat transfer medium through the conduit 84 and between heat exchangers 74 and 82. Thus, heat is effectively transferred from the pasteurized primary sludge to the primary sludge passing through the heat exchanger 74.

As seen in FIG. 2, the pasteurized primary sludge and the hydrolyzed biological sludge is combined and the combined sludges are directed into the anaerobic digester 40 where the sludges are subjected to anaerobic digestion. Biogas is produced by the anaerobic digester 40. This biogas, in one embodiment, is directed from the anaerobic digester to the steam generator 56 where it is used as an energy source for generating steam used in the hydrolysis reactor 36. In some embodiments, it may not be required that the sludges be combined. That is, in some embodiments the hydrolyzed biological sludge may be directed into the anaerobic digester 40 and the pasteurized primary sludge directed into the anaerobic digester where the sludges are combined therein and subjected to anaerobic digestion.

As discussed above, heat exchanger 38 is incorporated into a heat exchanger network that is operative to cool the hydrolyzed sludge and, at the same time, heat the primary sludge before entering the pasteurization unit. As shown in FIG. 2, a second heat exchanger 76 is incorporated into the primary sludge treatment section of the system. That is, heat exchanger 76 is disposed such that primary sludge passes therethrough. A conduit or line 90 is operatively connected between heat exchangers 38 and 76. A heat transfer medium is contained in the conduit or line 90 and a pump 92 pumps the heat transfer medium back and forth between heat exchangers 38 and 76. In addition, the heat transfer network includes a pressure controller 94 that generally maintains the pressure in the conduit 90 at a level that prevents the heat transfer medium from boiling. In one example, the pressure controller 94 maintains the pressure of the heat transfer medium at approximately 7 bars. There are cases where the ratio of biological sludge to primary sludge is such that additional cooling or heating is desired. Thus, incorporated into the heat transfer network that includes heat exchangers 38 and 76 is a cooling heat exchanger 96. This forms a part of an option that enables the heat transfer medium passing in conduit 90 to be cooled. In particular, a blower 98 is operative to pump air through a conduit 100 into the cooling heat exchanger 96 to cool the heat transfer medium passing in line 90. Furthermore, to provide the capability to heat the heat transfer medium, a heating heat exchanger 110 is operatively connected in the heat transfer network. Again, see FIG. 2. In this case, a pump 112 is operative to pump boiler water from a boiler through conduit 116 into and through the heat exchanger 110. A control valve 114 allows for the boiler water to the heat exchanger 110 to be controlled.

Example of Process

In one example, the biological sludge produced by the wastewater treatment system 10 is dewatered by the dewatering unit 26 and directed to the holding tank 32. In a typical case, the biological sludge will have a temperature of approximately 8-15° C. and the dry solids content will be approximately 18%. Pump 34 pumps the biological sludge to the hydrolysis reactor 36. The hydrolysis reactor may operate in a batch or plug flow mode. Steam from the steam generator 56 is injected into the hydrolysis reactor 36. In a typical example, the steam will have a temperature of approximately 165° C. to approximately 200° C. and will be at a pressure of approximately 200-240 psi (7-16 bar). Biological sludge in the hydrolysis reactor 36 is subjected to a thermal hydrolysis process which increases soluble COD, increases biogas potential, and decreases the viscosity of the biological sludge. As noted above, steam utilized by the hydrolysis reactor 36 is generated by steam generator 56, which can be powered by biogas produced by the anaerobic digester 40. In this example, a potable water source is used to feed the steam generator 56. Typically, the temperature of the potable water is approximately 8-15° C. However, after directing the potable water through the heat exchanger 54 (see FIG. 2), the temperature of the potable water is raised substantially. In one example, the temperature of the potable water may be raised to approximately 75° C. prior to entering the steam generator. By preheating the feedwater to the steam generator, this will substantially reduce the size of the steam generator 56. In some cases, the size of the steam generator is reduced as much as 10%.

In this example, the temperature of the hydrolyzed biological sludge leaving the hydrolysis reactor 36 is about 165° C. and the dry solids content of the sludge has been reduced to approximately 15%. The hydrolyzed biological sludge is then directed through heat exchanger 38 and thermal energy associated with the hydrolyzed biological sludge is transferred to the heat transfer medium that is flowing in heat transfer line or conduit 90. In this example, the heat exchanger 38 is configured to reduce the temperature of the hydrolyzed biological sludge from 165° C. to approximately 90° C.

After passing through heat exchanger 38, the hydrolyzed biological sludge is then directed through heat exchanger 54 which is designed to further cool the hydrolyzed biological sludge and to heat the feedwater to the steam generator 56. In this example, the temperature of the hydrolyzed biological sludge drops about 10° C. across the heat exchanger 54. Thus, in this example, the temperature of the hydrolyzed biological sludge leaving the heat exchanger 54 is approximately 80° C.

Thereafter, the hydrolyzed biological sludge is directed through another heat exchanger, heat exchanger 62. The purpose of heat exchanger 62 is to further cool the hydrolyzed biological sludge to an appropriate temperature for the downstream anaerobic digester 40. In this case, a cooling medium is directed through the heat exchanger 62. In this example, treated wastewater is pumped by pump 64 through heat exchanger 62 and is in a heat transfer relationship with the hydrolyzed biological sludge passing through the heat exchanger. The temperature of the hydrolyzed sludge (in this example) decreases approximately 40° C. across heat exchanger 62. Thus, the hydrolyzed biological sludge leaving heat exchanger 62, in this example, is at approximately 40° C. and the dry solids content is about 15%, but in typical cases may vary from about 15% to about 25%.

Downstream of heat exchanger 62 is a pump 66. Pump 66 is a pressure holding pump that functions to maintain the pressure in the associated line such that the hydrolyzed sludge does not boil.

Continuing to refer to the example, primary sludge from the thickener 14 is directed into holding tank 70. In this example, the temperature of the primary sludge is about 15° C. and has a dry solids content of approximately 4% to approximately 6%. Pump 72 pumps the primary sludge from the holding tank 70 through the heat exchanger 74. Pasteurized primary sludge is routed through heat exchanger 82. The temperature of the pasteurized sludge in this example is approximately 75° C. Heat from the pasteurized sludge is thusly transferred to the primary sludge via heat exchanger 74. In this example, it is contemplated that the primary sludge will have a temperature increase from 15° C. to approximately 50° C. across the heat exchanger 74. Thus the primary sludge leaving the heat exchanger 74 will have a temperature of approximately 50° C. After heating via the heat exchanger 74, the primary sludge is directed through another heat exchanger, heat exchanger 76 which is sometimes referred to as a second heat exchanger. Thermal energy is transferred from the hydrolyzed biological sludge to the heat transfer medium flowing in conduit 90 and the heat associated therewith is in turn transferred to the primary sludge flowing through heat exchanger 76. It is contemplated in this example that the temperature of the primary sludge will increase approximately 25° C. across heat exchanger 76. Thus, in this example, the temperature of the primary sludge leaving heat exchanger 76 is approximately 75° C. At this point, the temperature of the primary sludge has been raised to a pasteurization temperature which generally is at least 70° C. From the heat exchanger 76, the primary sludge, having a temperature of approximately 75° C., is directed to the pasteurization unit 78. As noted above, the pasteurization unit 78 can be designed for batch processing or plug flow. In the example illustrated, the pasteurization unit is shown in a batch configuration. The heated primary sludge is subjected to a pasteurization process in reactors, 78A, 78B and 78C. At any one time one of the reactors is being filled, one of the reactors is holding the primary sludge while the third reactor is in a drawdown mode. In any event, pump 80 pumps the pasteurized primary sludge through the heat exchanger 82 which, as discussed above, heats the incoming primary sludge. From the heat exchanger 82, the pasteurized primary sludge is combined with the cooled hydrolyzed biological sludge. In a typical example, the quantity of hydrolyzed biological sludge will be about the same as the quantity of pasteurized primary sludge. As noted above, the hydrolyzed biological sludge will typically have a dry solids content of approximately 15% while the pasteurized primary sludge may have a dry solids content of approximately 5%. Thus, when these two sludges are combined, the dry solids content in this example will be approximately 7.5%. With this approach of mixing the two sludge streams of differing dry solids content, ammonia toxicity in the digester 40 can be avoided without the need to add dilution water to the digester feed. It is also noted that with respect to the pasteurized primary sludge, the heat exchanger 82 in this example is effective to lower the temperature from about 75° C. to about 40° C. Thus, in this example, the temperature of the hydrolyzed biological sludge after cooling is 40° C., which is about the same as the cooled pasteurized primary sludge. Thus, once the two sludges are combined together, the temperature of the combined sludges is approximately 40° C.

There may be cases where the ratio of biological sludge to primary sludge requires supplemental cooling or heating. As shown in FIG. 2, the heat transfer network involving the two heat exchangers 38 and 76 is provided with a cooling heat exchanger 96 or a heating heat exchanger 110. Thus, if the ratio of biological sludge to primary sludge exceeds a certain value, then the heat transfer medium flowing in conduit 90 can be air cooled, as shown in FIG. 2, by the cooling heat exchanger 96. Conversely, if the ratio of the primary sludge to the biological sludge exceeds a certain value, then the heat transfer medium in conduit 90 can be further heated by boiler water directed through heat exchanger 110. Other sources of heat may be used to heat the heat transfer medium flowing in conduit 90. For example, steam from the steam generator 56 can be directed into heat exchanger 110. It is understood by those skilled in the art if steam is used in lieu of boiler water, the pump 112 and the valve 114 would not be required. It should be noted that the heat transfer medium in conduit 90 is maintained under pressure, at about 7 bars, for example, in order to prevent the heat transfer medium from boiling.

Therefore, it is appreciated that the present invention provides a thermal hydrolysis process for the biological sludge while allowing the primary sludge to be pretreated separately via a batch or plug flow pasteurization process at a temperature of approximately 70-75° C. It is contemplated that there is no appreciable benefit for subjecting the primary sludge to thermal hydrolysis prior to anaerobic digestion. The nature of primary sludge, being a complex mixture of lipids and carbohydrates, allow it to be readily hydrolyzed, via enzyme activity, and subsequently converted to long chain fatty acids, decomposed to acetate, and finally converted to methane gas under anaerobic conditions. These processes can occur readily in mesophilic or thermaphilic anaerobic digesters with no requirement for external disintegration methods such as thermal hydrolysis. Hence, the process disclosed herein uses only the quantity of steam required to thermally hydrolyze the biological sludge. As such, the quantity of steam required to enhance biogas generation (lbs. steam/net increase in biogas ($ft^3$)) will be lower than conventional processes which combine primary and secondary sludge prior to steam addition. Since the mass of primary sludge is often generally equal to the mass of biological sludge generated in the wastewater treatment process, this steam quantity is significant. Closely related to these advantages is the advantage that the high pressure-rated tankage associated with the steam and hydrolysis process is reduced.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating wastewater and resulting sludge comprising:
   subjecting the wastewater to a primary treatment and producing primary sludge and a primary effluent;
   subjecting the wastewater to primary treatment including directing the wastewater into a primary treatment system including a primary settling tank and settling the primary sludge in the primary settling tank and wherein the primary settling tank produces the primary effluent;
   thickening the primary sludge in a primary sludge thickener;
   directing the primary effluent to a biological treatment system and biologically treating the primary effluent to produce biological sludge;
   after thickening the primary sludge, directing the primary sludge to a pasteurization unit and pasteurizing the primary sludge;
   directing the biological sludge to a thermal hydrolysis reactor and hydrolyzing the biological sludge;
   directing the pasteurized sludge and the hydrolyzed sludge to an anaerobic digester; and
   anaerobically digesting the pasteurized primary sludge and the hydrolyzed biological sludge in the anaerobic digester.

2. The method of claim 1 including transferring heat from the hydrolyzed biological sludge to the primary sludge before the primary sludge enters the pasteurization unit, thereby cooling the hydrolyzed biological sludge and heating the primary sludge.

3. The method of claim 2 including directing the hydrolyzed biological sludge through a first heat exchanger downstream from the hydrolysis reactor and directing the primary sludge through a second heat exchanger upstream of the pasteurization unit; circulating a heat transfer medium through the first and second heat exchanger such that heat associated with the hydrolyzed biological sludge is transferred to the primary sludge.

4. The method of claim 3 including cooling the heat transfer medium when the ratio of primary sludge to biological sludge falls below a selected value, and heating the heat transfer medium when the ratio of the primary sludge to the biological sludge is above selected value.

5. The method of claim 3 wherein the heat transfer medium passes through at least two additional heat exchangers, a third heat exchanger for cooling the heat transfer medium and a fourth heat exchanger for heating the heat transfer medium.

6. The method of claim 5 wherein the third cooling heat exchanger is air cooled and wherein the fourth heating heat exchanger is heated by a boiler.

7. The method of claim 3 including maintaining the heat transfer medium under pressure to generally prevent the heat transfer medium from boiling.

8. The method of claim 2 including transferring heat from the pasteurized primary sludge to the primary sludge before the primary sludge enters the pasteurization unit.

9. The method of claim 1 including combining the hydrolyzed biological sludge with the pasteurized primary sludge; and directing the combined hydrolyzed biological sludge and pasteurized primary sludge into an anaerobic digester.

10. The method of claim 1 including dewatering the biological sludge before directing the biological sludge into the hydrolysis reactor.

11. The method of claim 1 wherein substantially all the thermal energy required to heat the pasteurized sludge to a pasteurization temperature is provided by transferring heat from the hydrolyzed biological sludge to the primary sludge, and by transferring heat from the pasteurized primary sludge to the primary sludge before the primary sludge enters the pasteurization unit.

12. The method of claim 1 including transferring sufficient heat from the hydrolyzed biological sludge to the primary sludge to raise the temperature of the primary sludge at least 20° C. prior to entering the pasteurization unit.

13. The method of claim 1 including raising the temperature of the primary sludge by transferring heat from the pasteurized primary sludge to the primary sludge before entering the pasteurization unit; and also raising the temperature of the primary sludge by transferring heat from the hydrolyzed biological sludge to the primary sludge before the primary sludge enters the pasteurization unit.

14. The method of claim 13 wherein raising the temperature of the primary sludge includes first transferring heat from the pasteurized primary sludge to the primary sludge and thereafter transferring heat from the hydrolyzed biological sludge to the primary sludge before the primary sludge enters the pasteurization unit.

15. The method of claim 1 including multiple cooling processes for cooling the hydrolyzed biological sludge before reaching the anaerobic digester, the multiple cooling processes including:
   i. cooling the hydrolyzed biological sludge by transferring heat therefrom to the primary sludge;
   ii. cooling the hydrolyzed biological sludge by transferring heat therefrom to a steam generator feedwater; and
   iii. cooling the hydrolyzed biological sludge by transferring heat therefrom to a treated waste stream.

16. The method of claim 1 including processing the biological sludge such that the dry solids content of the hydrolyzed sludge exceeds the dry solids content of the pasteurized sludge, expressed on a percentage weight basis.

17. The method of claim 1 wherein the wastewater comprises a single stream of wastewater and wherein the single stream of wastewater is first subjected to primary treatment which produces the primary sludge and thereafter subjected to biological treatment downstream of the primary treatment which produces the biological sludge, and wherein both the primary sludge and biological sludge are derived from the single stream of wastewater.

18. The method of claim 17 including:
   dewatering the biological sludge before directing the biological sludge into the hydrolysis reactor;
   transferring heat from the hydrolyzed biological sludge to the primary sludge before the primary sludge enters the pasteurization unit, thereby cooling the hydrolyzed biological sludge and heating the primary sludge;
   directing the hydrolyzed biological sludge through a first heat exchanger downstream from the hydrolysis reactor and directing the primary sludge through a second heat exchanger upstream of the pasteurization unit; circulating a heat transfer medium through the first and second heat exchanger such that heat associated with the hydrolyzed biological sludge is transferred to the primary sludge;
   cooling the heat transfer medium when the ratio of primary sludge to biological sludge falls below a selected value, and heating the heat transfer medium when the ratio of the primary sludge to the biological sludge is above a selected value;
   wherein the heat transfer medium passes through at least two additional heat exchangers, a third heat exchanger for cooling the heat transfer medium and a fourth heat exchanger for heating the heat transfer medium; and
   wherein the third cooling heat exchanger is air cooled and wherein the fourth heating heat exchanger is heated by a boiler.

19. The method of claim 1 further including directing a steam generator feedwater to a water treatment unit and removing scaling or fouling species from the steam generator feedwater; thereafter directing the feedwater and hydrolyzed sludge to a heat exchanger and cooling the hydrolyzed biological sludge by transferring heat from the hydrolyzed biological sludge to the steam generator feedwater; and thereafter directing the steam generator feedwater to a steam generator and generating steam and utilizing the steam generated by the steam generator in hydrolyzing the biological sludge.

* * * * *